July 2, 1957 J. GOLDBERG ET AL 2,798,216

DATA SORTING SYSTEM

Filed April 16, 1954 4 Sheets-Sheet 1

JACOB GOLDBERG
BONNAR COX
INVENTORS

BY Lyon & Lyon

ATTORNEYS

July 2, 1957 J. GOLDBERG ET AL 2,798,216

DATA SORTING SYSTEM

Filed April 16, 1954 4 Sheets-Sheet 2

JACOB GOLDBERG
BONNAR COX
INVENTOR.

BY Lyon & Lyon

ATTORNEYS

July 2, 1957 J. GOLDBERG ET AL 2,798,216

DATA SORTING SYSTEM

Filed April 16, 1954 4 Sheets-Sheet 3

INVENTORS
JACOB GOLDBERG
BONNAR COX
BY Lyon & Lyon
ATTORNEYS

July 2, 1957 J. GOLDBERG ET AL 2,798,216

DATA SORTING SYSTEM

Filed April 16, 1954 4 Sheets-Sheet 4

INVENTORS
JACOB GOLDBERG
BONNAR COX
BY Lyon & Lyon
ATTORNEYS

United States Patent Office 2,798,216

Patented July 2, 1957

2,798,216

DATA SORTING SYSTEM

Jacob Goldberg and Bonnar Cox, Palo Alto, Calif.

Application April 16, 1954, Serial No. 423,558

15 Claims. (Cl. 340—347)

This invention relates to a system for electronically sorting data and, more particularly, to a system for sorting data which is stored in random fashion.

One of the operations which is often required in electronic information handling machines of the type known and used at present is to take data which is randomly stored and to rearrange that data so that it is in a desired order. The favored method of coding data for machine handling is to employ one of the several binary codes. Thus the data may be arranged in an order determined by the numerical sequence of the binary coding. Other methods for arranging data wherein the binary coding represents information of a number of different categories is to give each category a number. Thus, for orderly storage purposes, information with its assigned number, which usually arrives in the machine in random order, is put in a desired sequence using these identifying numbers. It should be apparent, therefore, that a desirable and necessary piece of apparatus is one for arranging in order data which is randomly stored.

A feature of the present invention is the provision of apparatus that can receive randomly stored binary numbers from a source and can select the highest or lowest of those numbers, as desired, from the data being presented.

Another feature of the present invention is the provision of apparatus which can be used to arrange, in order, information which is randomly arranged.

Still another feature of this invention is the provision of novel, useful, and simple sorting apparatus for binary coded information.

These and other objects of this invention are achieved in a system wherein information is provided from a source in the form of binary coded numbers in serial order, with the least significant digit first. A first of these numbers is entered into a first circulating stepping register, which proceeds to circulate a first number while a second number is being entered into a second circulating stepping register. Each register has at its input end a digit comparing stage. Arrangement of the stepping sequence and entering sequence is made so that at this digit comparing stage in both registers the numbers pass with the same digit order for each number being simultaneously present. Means for comparing the digits is coupled to both digit comparing stages. This means provides a first output or a second output, dependent upon which of the two digits present is the larger. A further means is provided which is responsive to a complete number being entered into a register from the source and also to the output of the last named means to open for circulation only one of the two circulating registers. Accordingly, the register which cannot circulate its contents steps them out and, in turn, receives another number from the data source. Thus, if it is desired that the circulating register be left with the smallest number of those being entered, then the register containing the larger number is the one which is prevented from circulating after a number comparison. If the register having the smaller number is prevented from circulating after a comparison, then at the end of a sorting cycle the register which is at that time connected to circulate is left with the largest of all the numbers in the data source.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

The information handling machines used at present usually store binary coded data on magnetic tape or magnetic drums, and, in a few instances, photographic storage of binary coded data is used. Such data may be stored in parallel fashion. That is, a binary number consisting of, for example, six binary digits is stored transversely on tape and is followed by other six binary digit numbers similarly stored. The transverse storage space for the six digits is usually referred to as a slot, each binary digit being stored in a cell in that slot. Each of these cells usually is aligned with a cell in the preceding slot, and the aligned cells are referred to as tracks. This type of storage is also used with magnetic drums.

Another manner of storage is to store binary digits in serial fashion longitudinally. That is, six binary digits are stored, one digit in each cell, but the cells occupied by a number extend longitudinally along the tape and are contained in a track.

The embodiment of this invention which is described herein is described in connection with data being supplied serially from a source of data. This source of data may be a track on a drum or on tape from which the binary digits are read. In the case of parallel data storage on a magnetic medium, the data can be readily read from the tape or drum into a register from whence it may be stepped out to be serial. Accordingly, although the invention is described in connection with a serial type of data source, it is to be understood that this is not to be construed as a limitation on the invention, since it is well within the skill of one versed in the art to convert data from parallel form to serial form, or vice versa.

Figure 1:
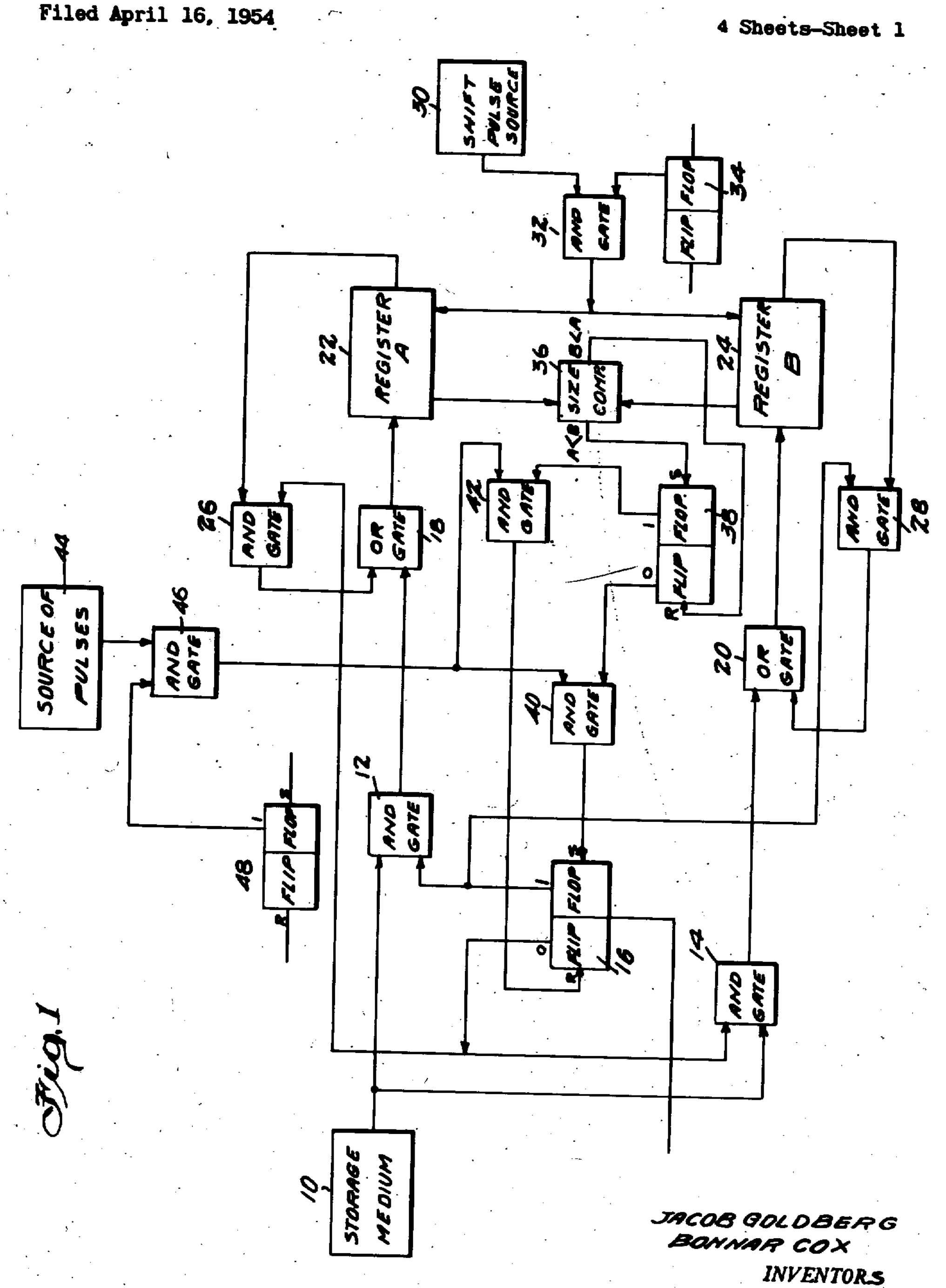
Figure 1 is a block diagram of the invention.

Referring now to Figure 1 of the drawing, there is shown a block diagram of an embodiment of the invention The source of binary numbers is represented by a rectangle 10 labelled as a storage medium. It will be understood that this can represent any device, such as the drum or tape previously mentioned, which is capable of providing binary numbers in serial fashion with the lowest order digit coming first. The input from the storage medium is applied to a first and a second input And gate 12, 14. A first flip-flop circuit 16 has one output designated as "0" connected to the other input of the second input And gate 14. Another or second output of the first flip-flop, designated as "1", is connected to the other input of the first input And gate 12. The outputs of the first and second input And gates 12, 14 are respectively connected to two Or gates 18, 20. The outputs of these Or gates are respectively connected to a first and a second serial shifting register 22, 24. Both of these registers are respectively made circulatory by employing a first and second feedback And gate 26, 28, each of which has one input connected to the output of the respective registers 22, 24 and the outputs respectively connected to the Or gates 18, 20. The "1" output of the first flip-flop 16 is connected to a second input of the second feedback And gate 28 and the "0" output of the first flip-flop 16 is connected to a second input of the first feedback And gate 26.

Means are provided for applying shift pulses from a shift-pulse source 30 to the shifting registers 22, 24. These pulses are applied through an And gate 32 which has as its second input the output from a shift pulse control flip-flop 34. The first or input stage of each shifting register can be termed a digit comparing stage. Means to compare the digits present at the input stage of each register are provided. This is designated as a size comparator 36 and operates to provide one output when the digit in the first register is larger than the digit in the second register and provides a second output when the digit in the second register is larger than the digit in the first register. If the first register is designated as register A and the second register as register B, then the outputs from the size comparator may be designated A<B and B<A.

These two outputs respectively are applied to a second flip-flop 38 in a manner so that when the output from the size comparator is A<B, the "1" output of the flip-flop is more positive, and when the size comparator output is B<A the "0" output from the flip-flop is more positive. The "0" and "1" outputs of the second flip-flop 38 are respectively applied to two transfer And gates 40, 42. The output of one of these And gates 40 (the one driven by the "0" flip-flop output) is applied to the first input of the first flip-flop 16. The output of the other transfer And gate 42 (the one driven by the "1" output of the second flip-flop) is applied to the second input of the first flip-flop. The second inputs of the transfer And gates 40, 42 are connected to a source of quiz pulses 44 through an And gate 46 which is controlled by means of a control flip-flop 48.

A flip-flop circuit of a type suitable for use herein may be found described and shown in High-Speed Computing Devices, chapters 3 and 4, by Engineering Research Associates, Inc., and published by the McGraw-Hill Book Company. The flip-flop, as is well known, includes two tubes with cross-connected grids and anodes. It has two stable conditions, one with one tube conducting and the other tube cut off, and the second condition with the conduction-nonconduction states of the tubes reversed. If one condition is designated as the reset condition and the other condition as the set condition, then the tube grid to which a positive pulse is applied to establish a flip-flop in its reset condition may be designated as a reset input ("R" in the drawings). Accordingly, the other tube grid may be designated as a set input ("S" in the drawings). The tube output that is high (tube is nonconducting) when the flip-flop is in its reset condition is the "0" output, and the tube output that is high when the flip-flop is in its set condition is the "1" output. This describes the usual practice in the electronic computer art.

An Or gate such as is represented by a rectangle in the drawing is also known as a buffer, and it operates to provide an output when any one or more of its inputs are present. However, it does not provide any output when none of its inputs are present. Using the computer language, the output of an Or gate is "1" when any one of its inputs is "1" and its outputs are "0" when all of its inputs are "0."

An And gate such as is represented by a rectangle in the drawing is also known as a coincidence gate and it operates to provide an output only when all of its inputs are simultaneously excited. Its output is high or "1" when all of its inputs are simultaneously "1" and its output is low or "0" when any of its inputs is "0." And gates and Or gates are found described in the previously mentioned book. Suitable types are also described and shown in an article by Felker in Electrical Engineering, volume 71, No. 12, December 1952, entitled Typical Block Diagrams for a Transistor Digital Computer.

Figure 2:
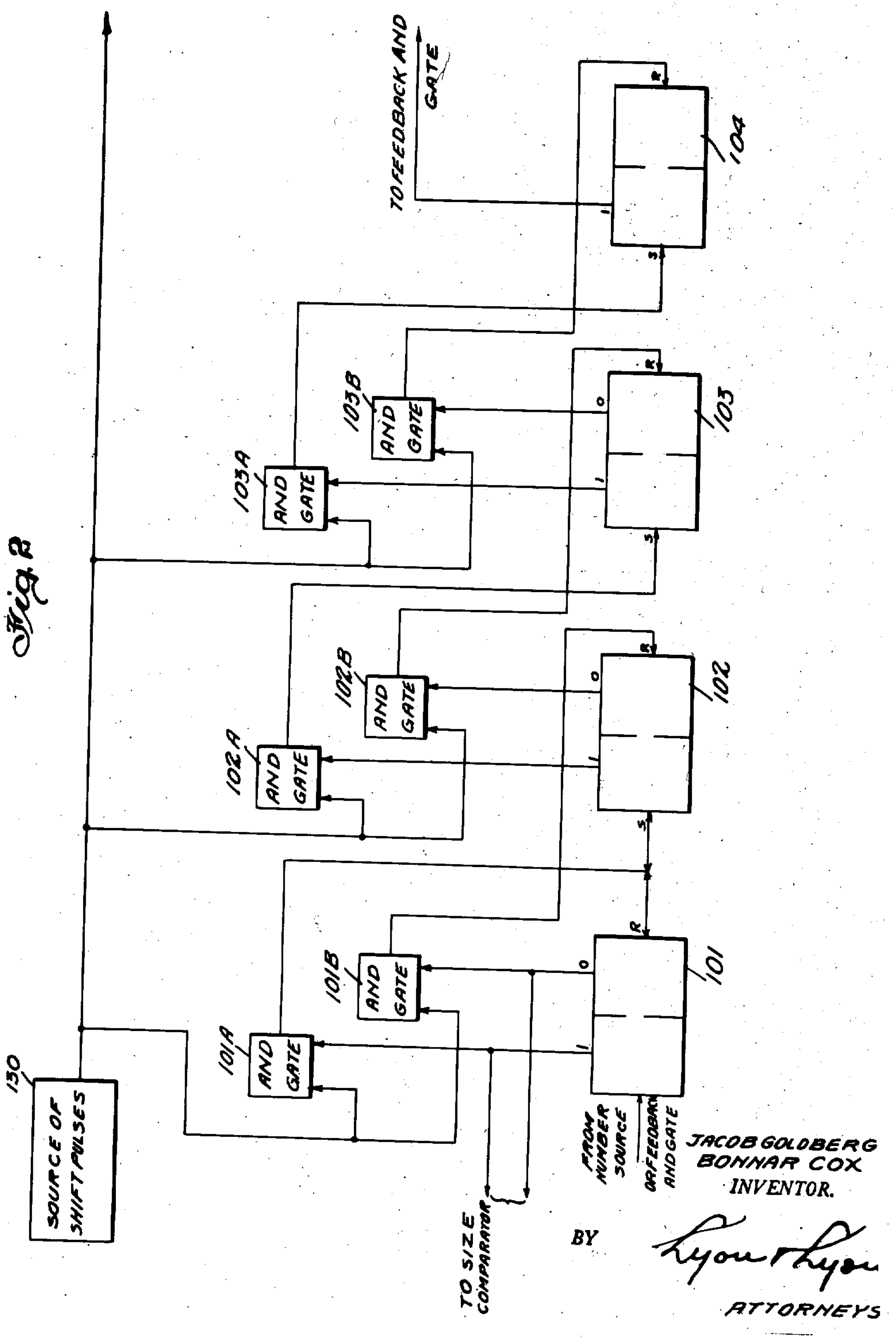
Figure 2 is a block diagram of a suitable circulating stepping register.

A shifting register of a suitable type is shown and described in an article published in Electronics magazine, pages 181–184, for November 1949, by Stevens and Knapton and is entitled Gate-Type Shifting Register. To assist in an understanding of this invention, a block diagram of a suitable shifting register, such as described in the abovementioned article, is shown in Figure 2. This will be described subsequently.

Considering the operation of the embodiment of the invention, let it be assumed that the first flip-flop 16 is energized so that the "1" output is high. This permits a number to come from the storage medium 10 through the first input And gate 12 through the Or gate 18 to be entered into the register 22. It should be noted here that the register has as many stages as there are digits in the numbers desired to be compared. In other words, if the numbers have eight digits then each stepping register should have eight stages, and the first stage is considered as the input or digit comparing stage. The shift pulse control flip-flop 34 is tripped to open gate 32 and permit the application of shift pulses from the source 30 to the registers. Once a number is entered into the first register, the first flip-flop 16 is actuated either manually or by means to be described later to be tripped, so that its "0" output is high. This operates to open the second input And gate 14 and to open the first feedback And gate 26. Thus while a second number is being applied from the storage medium through the second input And gate 14 to the second register 24, the number in the first register is permitted to circulate through the first feedback And gate 26 into the register again. The timing is such that the lowest order digit in the first register is shifted into the input stage at the same time as the lowest order digit of the second number is entered into the input stage of the second register. The shift pulse then acts to transfer these lowest order digits in both registers to the second stage and to thereby permit entry of the second lowest order numbers into the input stages. The size comparator 36 serves to trip the second flip-flop 38 in accordance with whether the number in the A register is larger than that in the B register, or vice versa. Thus, in accordance with the convention selected, when A<B the "1" output of the second flip-flop is high and when B<A the "0" output of the second flip-flop is high. If both digits in the register digit comparing positions are the same, no output is provided by the size comparator and the second flip-flop remains in the condition it had from the previous digit comparison. Thus the second flip-flop assumes one or the other of its two conditions of stability, as determined by the size comparator.

The control flip-flop 48 which controls the And gate 46 coupled to the source of quiz pulses 44 is opened to permit a pulse from the quiz-pulse source 44 to be applied to the transfer And gates. However, the quiz-pulse source provides a pulse output only after a complete number has been entered into a shift register. This can be very easily achieved in a number of ways. One is by counting the digits as they are entered into the apparatus, since the number of digits (whether "0" or "1") in every one of the numbers being entered is the same. Thus the quiz-pulse source can consist of a binary counter, for example, wherein when the count equals the predetermined number of digits an output pulse is applied to the two transfer And gates.

The two transfer And gates then transfer the condition of the second flip-flop to the first flip-flop. Thus if the second flip-flop has its "1" output high the first flip-flop, in accordance with the connections shown, will have its "0" output high. This operates to maintain the first feedback And gate open and to open the second input And gate. Since the second feedback And gate is closed, the number in the second register is stepped out by the shifting pulses and is replaced by a third number from the storage medium while the number in the first shifting register is circulated. The number left in the first shifting register is the smaller of the two in accordance with the convention adopted.

The comparison cycle is repeated, the size comparator providing an output as each digit passes by the digit comparing position. When the last digit of a number is entered into the second register, another pulse is provided by the source of quiz pulses. Assume this time that the "0" output of the second flip-flop is high, the first flip-flop will then be set with its "1" output high. This, in turn, opens the second feedback And gate and the first input And gate. Thus the number in the second register is circulated while the number in the first register is replaced. It is interesting to note that if the higher order digits are the same the size comparator provides no output and the second flip-flop maintains whatever condition it assumed in response to the compared size of the last lower order digits to be compared.

Thus the embodiment of the invention shown operates in continuous fashion to compare numbers being successively supplied from the storage medium. With the arrangement shown, at the end of the operation cycle the lowest one of the numbers received from the storage medium remains in the registers. The shift-pulse source may be closed by resetting the shift-pulse control flip-flop and the quiz-pulse source may also be closed by resetting its control flip-flop.

If it is desired that the apparatus select the largest of the numbers provided from the storage medium, all that is required is to reverse the connections from the transfer And gates to the first flip-flop so that the "1" output of the second flip-flop is applied to the set input of the first flip-flop and the "0" output of the second flip-flop is applied to the reset input of the first flip-flop. This permits circulation in the register containing the larger number so that the number contained in the other register is transferred out.

The data on a drum may be fed from each track in sequence to this apparatus or there is provided the circuitry shown for each track so that each track is sorted separately. If it is desired to sequentially sort information from a cyclic source of data such as a magnetic drum, then the binary coded numbers are fed from the tracks in sequence. As shown above, the sorter retains the smallest (or largest) number in the shift register. This number is then shifted out and stored. The drum is then rotated through a second cycle and means are provided which either erase or mark each place where a number equal to the stored number appears. This serves to prevent entry of this number into the sorter. The drum is then rotated through another cycle during which the sorter searches for the next smallest number, as previously described. This is followed by another cycle during which all the next smallest numbers are marked or erased. Thus by following sorting with marking cycles of the drum, the information on the drum is rapidly sorted into a sequence. Apparatus is well known for comparing binary numbers for equality. Apparatus of this type is used to compare the number which is stored in the register from the sorter with the numbers in the cyclic data source for the purpose of marking or erasing them during the marking cycle, thus preventing their being considered again by the sorter.

Referring now to Figure 2, a block diagram of a suitable type of shift register is shown. This consists of, for example, four trigger circuits 101—104 of the type previously identified. Two And gates 101A—103A, 101B—103B are connected to the "1" and "0" outputs respectively of each trigger circuit. These And gates also are connected to a source of shift pulses 130. The output of the And gates 101A—103A are respectively connected to the set input of the succeeding trigger circuits. The output of the And gates 101B—103B are respectively connected to the reset inputs of the succeeding trigger stages. Thus upon application of a shift pulse to all the gates only those gates which also have their inputs connected to the trigger circuits high will provide a pulse to the succeeding flip-flop. If the succeeding flip-flop is in the same condition as the preceding flip-flop, the output from the And gate will not affect it. If it is not in the same condition as the preceding flip-flop, the And gate output will transfer it into the same condition. The first flip-flop 101 is reset by the output of the And gate 101A which is also connected to its reset input. Binary digits are applied to the first flip-flop stage from the number source. Each binary digit is followed by a shift pulse which transfers it to the succeeding register stage. If a binary digit is a "0," no reset of the first stage is necessary. The input stage 101 of the register is the digit comparing stage or position of the register and is connected to the size comparator. Feedback to the feedback And gate is taken from the "1" output of the last stage 104 of the register.

Figure 3:
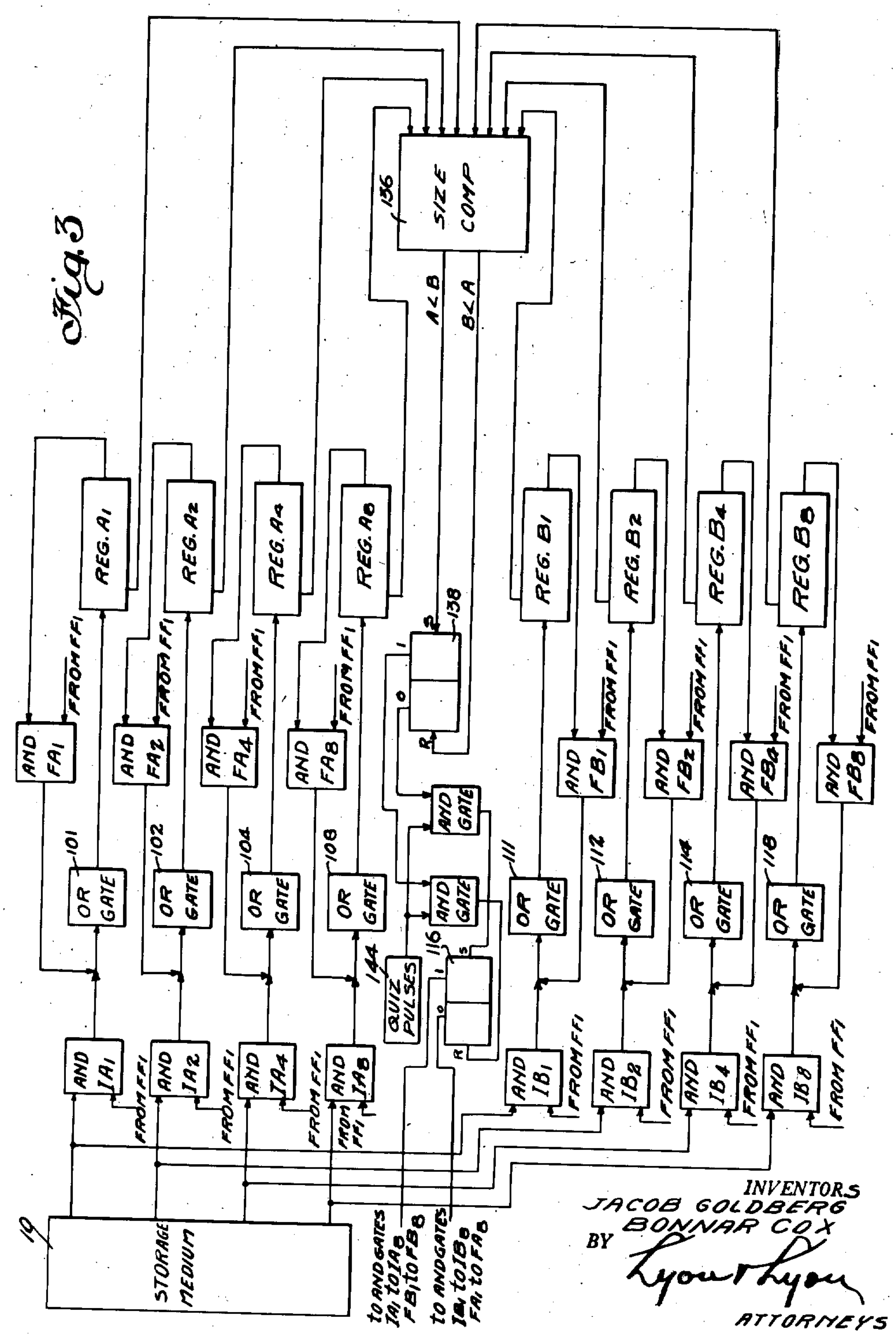
Figure 3 is a block diagram of an embodiment of the invention for use with binary coded decimal.

Figure 3 is a block diagram of an embodiment of our invention which may be employed to obtain the smallest one of binary coded decimal numbers being supplied from a storage medium. The drawing has been simplified in the interest of clarity by omitting certain structures, for example, a source of shift pulses which, however, will be understood by those well skilled in the art as being required to practice the invention. These structures, however, will be found in Figure 1. A binary coded decimal number is one wherein each of the digits in a number expressed in the decimal system is represented by its binary number equivalent, thus 325 is represented as 0011—0010—0101. Since nine is the largest decimal system digit that is represented in this system, four binary system digits are used to represent each decimal system digit (i. e., 0000 to 1001). Since each decimal digit is represented by four binary digits, four stepping registers are required for each decimal number. These are designated as $A_1$, $A_2$, $A_4$, and $A_8$ for one number and $B_1$, $B_2$, $B_4$, and $B_8$ for the second number. The four binary digits representing a decimal system digit are simultaneously entered into the four registers, the digit order being preserved in accordance with the subscript of the register designation, i. e., binary digits corresponding to $2^3$, $2^2$, $2^1$, $2^0$ are respectively entered into registers $A_8$, $A_4$, $A_2$, $A_1$, or $B_8$, $B_4$, $B_2$, $B_1$, as the case may be. The number of stages in each register is determined by the number of decimal system digits in the decimal numbers to be compared. The decimal digit representative binary numbers are entered into the registers in the same order as was described in Figure 1, lowest decimal order first. That is, the four binary digits representing the lowest order decimal digit are entered first, the four binary digits representing the next lowest order decimal digit are entered next, and this procedure is then continued until, for example, a complete number is entered into the four A registers. Entry is made as before, through input And gates $IA_1$ through $IA_8$ and Or gates 101, 102, 104, and 108 respectively associated with the $A_1$—$A_8$ registers. These input And gates are held open by establishing the first flip-flop 116 in its set condition with its "1" output high.

Next the first flip-flop is established in its reset condition with its "0" output high, thus opening the input And gates $IB_1$—$IB_8$, and the feedback And gates $FA_1$, $FA_2$, $FA_4$, $FA_8$. A secondary binary coded decimal number is entered into the B registers through And gates $IB_1$—$IB_8$ and Or gates 111, 112, 114, 118 in the same manner as the first number was entered into the A registers. As the number in the A registers is being circulated past the digit comparing position of the A register (here the first stage in each one of the four A registers) it is compared with the number being entered into the B register (at the first stage in each one of the four B registers).

The size comparator 136 functions in the same manner as was described for the size comparator 36 in Figure 1. It provides an output $A<B$ or $B<A$ as each binary coded decimal digit arrives at the comparing stages of the two registers. When the second number has been completely entered, the quiz-pulse source 144 functions as does the quiz-pulse source in Figure 1 to transfer the condition of the second register 138, which has been established by the last output from the size comparator 136, to the first flip-flop. The first flip-flop then gates open the proper input And gates and feedback And gates, as previously described, to permit the larger of the two numbers to be transferred out and replaced by a new number while the smaller of the two numbers is circulated.

Figure 4:
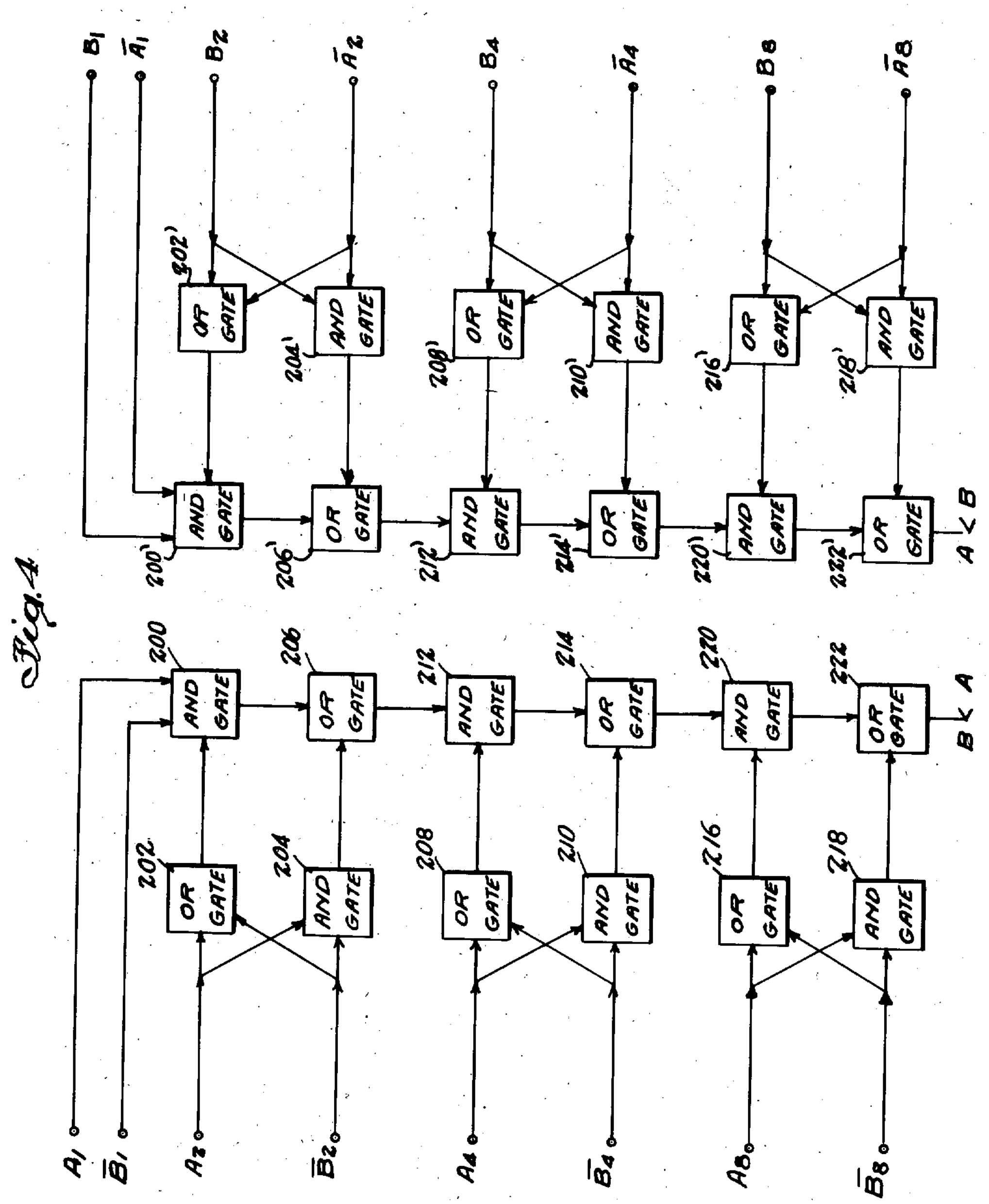
Figure 4 is a block diagram of a digit comparing device suitable for use in the embodiment of the invention shown in Figure 1.

The circuit diagram for a size comparator which can function to provide the outputs $A<B$ or $B<A$ may be seen in Figure 4. This consists of two identical networks. The connections with the registers differ, however. There are two output terminals, one being designated as $B<A$ and the other as $A<B$. The input terminals to the two networks respectively bear the designations $A_1$—$A_8$, $\overline{A}_1$—$\overline{A}_8$, $B_1$—$B_8$, and $\overline{B}_1$—$\overline{B}_8$. $A_1$—$A_8$ means that these terminals are respectively connected to the "1" output terminal of the input stage of the register correspondingly designated in Figure 3 (also see Figure 2). $\overline{A}_1$—$\overline{A}_8$ means that these terminals are respectively connected to the "0" output terminal of the input stage of the register correspondingly designated in Figure 3 (also see Figure 2). From the above, the connections of the $B_1$—$B_8$ and $\overline{B}_1$—$\overline{B}_8$ input terminals to the $B_1$—$B_8$ register should also be apparent. It should also be borne in mind that when an input stage, say of the $A_1$ register, holds a zero, the "0" output and, consequently, the $\overline{A}_1$ terminal is high or more positive, and the "1" output and, consequently, the $A_1$ terminal is low. Similarly, should the input stage hold a "1," the $A_1$ terminal is high and the $\overline{A}_1$ terminal is low.

As seen in Figure 4, $A_1$ and $\overline{B}_1$ terminals are coupled to two inputs to an And gate 200, the $B_1$ and $\overline{A}_1$ terminals are connected to two inputs to another And gate 200'. The $A_2$ and $\overline{B}_2$ input terminals are each connected to both an Or gate 202 and to an And gate 204. The Or gate 202 output is connected to a third input of And gate 200, the And gate 204 output is connected to an Or gate 206. And gate 200 has its output also connected to Or gate 206. The $B_2$ and $\overline{A}_2$ terminals are connected, in similar fashion as are the $A_2$ and $\overline{B}_2$ terminals, to Or gate 202' and And gate 204'. The connections of the remaining terminals to the Or gates 208, 216, 208', 216' and And gates 210, 218, 210', 218' as well as the interconnections between the Or gates 214, 222, 214', 222' and And gates 212, 220, 212', 220' are symmetrical and follow the pattern established and described for the $A_2$, $\overline{B}_2$ and $B_2$, $\overline{A}_2$ terminals.

The operation of these networks can best be illustrated by an example. Assume that the binary number in the digit comparing stages of the A registers is 0110 and that the binary number in the digit comparing stages of the B registers is 1000. Then, the "high" terminals are $\overline{A}_1$, $A_2$, $A_4$, $\overline{A}_8$ and $\overline{B}_1$, $\overline{B}_2$, $\overline{B}_4$, $B_8$. Thus And gate 204 will apply a pulse through Or gate 206 to And gate 212. And gate 212 receives a second required input from Or gate 208. And gate 210 is also open. Or gate 214 can apply a pulse to And gate 220. However, since neither $A_8$ nor $\overline{B}_8$ are high, the second required input to And gate 220 is not provided, and hence it cannot pass an output pulse to the output terminal. Considering the $A<B$ network, since $B_8$ and $\overline{A}_8$ are both high, And gate 218' is opened to apply a pulse to the output terminal through Or gate 222'.

The size comparing networks do not provide any output when the numbers in the A registers and B registers digit comparing positions are equal. For a simple comparison of two binary digits, only And gates 200 and 200' need be used and their connections to the $A_1$, $\overline{B}_1$ and $B_1$, $\overline{A}_1$ terminals. It will be appreciated that the digit comparing positions may refer to one position in one register or to a plurality of registers. Furthermore, in comparing the size of two digits of a number, each digit may be represented by a plurality of binary digits.

Accordingly, there has been described and shown herein novel, useful, and simple apparatus which is suitable for determining the lowest or highest number in data presented thereto and for use in sorting such data in a desired sequence.

We claim:

1. Apparatus for comparing a first and a second number for size comprising digit comparing positions, means for simultaneously passing each of said numbers a digit at a time, least significant digit first past said digit comparing positions, means coupled to said digit comparing positions for providing a first output responsive to a first number digit being greater than a second number digit and a second output responsive to a second number digit being greater than a first number digit, and means actuated after the most significant digits of said numbers are at said digit comparing positions responsive to a first output to store only said first number and responsive to a second output to store only said second number.

2. Apparatus for comparing for size numbers from a source, said numbers being applied serially, least significant digit first to said apparatus comprising circulating register means for each number, digit comparing positions in said circulating register, means to enter a first number from said source into one of said circulating register means, means to enter a second number from said source into said other of said circulating register means, means to control the circulation of said first number and the entry of said second number to present the same order of digits substantially simultaneously at said digit comparing positions, comparing means coupled to said digit comparing positions to present an output indicative of which of the two digits at said digit comparing position is the greater, and means responsive to the entry of a number in one of said register means and to the output of said comparing means to permit only one of said register means to circulate its contents whereby the contents of the other register means are transferred out to be replaced by another number.

3. Apparatus for comparing for size binary coded decimal numbers from a source, said binary coded decimal numbers being applied serially, least significant decimal digit represented by a binary number first, said apparatus comprising a first and second plurality of circulating registers, the number of registers in each plurality being determined by the number of binary digits required to represent a decimal digit, each register being associated with one order of the binary number used to represent a decimal system digit, digit comparing positions in each register in said first and second plurality of circulating registers, means to enter a first number from said source into said first plurality of registers, means to enter a second number from said source into said other of said plurality of circulating registers, means to control the circulation of said first number and the entry of said second number to present the same order of binary coded decimal digits substantially simultaneously at said digit comparing positions, comparing means coupled to said digit comparing positions to present an output indicative of which of the two digits at said digit comparing position is the greater, and means responsive to the entry of a number in one of said plurality of circulating registers and to the output of said comparing means to permit only one of said plurality of circulating registers to circulate its contents whereby the contents of the other plurality of circulating registers are transferred out to be replaced by another number.

4. Apparatus as recited in claim 3 wherein each of said first and second plurality of circulating registers includes a serial shifting register and an And gate having two inputs and an output, one of said inputs being coupled to said register output, the other of said inputs being coupled to said means to control the circulation of said first number and entry of said second number, and the output of each said And gate is coupled to the input of its associated register.

5. Apparatus for comparing a first and a second binary number for size comprising a first and a second serial shift register each having an input stage, means for respectively entering said first and said second binary numbers into said first and said second serial shift registers through their respective input stages, a digit at a time and least significant digit first, means to apply pulses to both said registers to shift the digits entered therein, size comparing means coupled to the input stages of said first and second serial shift registers to provide a first output when the digit in the input stage of said first serial register exceeds the digit in the first input stage of said second serial register and a second output when the digit in said first register input stage is less than the digit in said second register input stage, first and second closed gates respectively coupled between the last stage of each said first and second registers and the input stages to said respective registers to permit when open circulation of the digits of a number in said respective registers, and means actuated after said numbers have been entered in said registers and responsive to the output of said size comparing means to open one of said first and second gates.

6. Apparatus as recited in claim 5 wherein said means actuated after said numbers have been entered in said registers is responsive to a first output from said size comparing means to open said second gate and to a second output from said size comparing means to open said first gate whereby the smallest of said binary numbers remains in said registers.

7. Apparatus as recited in claim 5 wherein said means actuated after said numbers have been entered in said register is responsive to a first output from said size comparing means to open said first gate and to a second output from said size comparing means to open said second gate whereby the largest of said binary numbers remains in said registers.

8. Apparatus for determining the lowest number in a source of numbers which are supplied to said apparatus serially and with the least significant digit first said apparatus comprising at least a first and a second serial shift register, each of which has an input and an output stage, a first and second closed feedback gate respectively coupling the output to the input stage of each said first and second registers, a first and second closed input gate respectively coupling said source of binary numbers with the respective input stages of said first and second registers, means to open said second feedback gate and said first input gate to permit entry of a first number into said first register, means to open said first feedback gate and said second input gate to permit entry of a second number into said register, means to apply shift pulses to said first and second registers to circulate said first number a digit at a time through said first feedback gate while said second number is being entered a digit at a time into said second register, means coupled to the input stage of said first and second registers to provide a first output when the digit in said first input stage is lower than the digit in said second input stage and to provide a second output when the digit in said second input stage is lower than the digit in said second input stage, means actuated after a number is entered into one of said registers to actuate said means to open said first input gate and said second feedback gate responsive to a second output and to actuate said means to open said second input gate and said first feedback gate responsive to a first output whereby the smaller of the two numbers is retained in the register, the larger of the two numbers is transferred out and a new number is entered for comparison with the remaining lowest number.

9. Apparatus for determining the lowest number in a source of numbers which are supplied to said apparatus serially with the least significant digit first said apparatus comprising a first and second serial shift register each of which has an input and an output stage a first and a second feedback And gate respectively having one input coupled to the respective register output stages and their outputs coupled to the respective register input stages, a first and a second input And gate, a first flip-flop circuit having a first and a second output, means coupling one input of said first and second input And gates to said source of binary numbers, means coupling said flip-flop first output to a second input of said second And gate and said first feedback gate, means coupling said flip-flop second output to a second input of said first input And gate and said second feedback And gate, means to drive said flip-flop to provide a first output to open said second input And gate to transfer digits of a number into said second register and to open said first feedback And gate, means to apply shift pulses to said first and second registers to synchronize the entry and transfer of digits therein, means to drive said flip-flop to provide a second output to open said first input And gate to transfer digits of another number into said first register and to open said second feedback And gate, size comparator means coupled to said first and second register input stages to provide a first output when the digit in said first input stage is lower than the digit in said second input stage and to provide a second output when the digit in the second input stage is lower than the digit in said first input stage, means actuated by the entry of a complete number from said source to apply said size comparator first output to drive said flip-flop to provide a first output and to apply said size comparator second output to drive said flip-flop to provide a second output whereby the lowest of said numbers remains in said registers and the other is replaced by a succeeding number from said source.

10. Apparatus as recited in claim 9 wherein said means actuated by the entry of a complete number from said source includes a second flip-flop having a first and second output, means coupling said size comparator means output to said second flip-flop to energize its first output responsive to a size comparator first output and to energize its second output responsive to a size comparator second output, means to generate a pulse after a number has been entered into said apparatus from said source, a pair of And gates each having two inputs and an output, means coupling one input of said pair of And gates to said means to generate a pulse, means coupling another input of one of said And gates to the first output of said second flip-flop, means coupling the output of said one And gate to said first flip-flop input to drive it to provide a first output when actuated, means coupling another input of said other And gate to the second output of said second flip-flop, and means coupling the output of said other And gate to said first flip-flop to drive it to provide a second output when actuated.

11. Apparatus for determining the largest or smallest of the numbers in a source of numbers which are supplied to said apparatus serially with the least significant digit first said apparatus comprising a first and second input And gate each having two inputs and an output, a first and second serial shift register each having an input and output stage, a first and second feedback And gate each having a pair of inputs and an output a first flip-flop having first and second inputs and first and second outputs respectively energized when either said first or second input is energized, means coupling one input of said first and second input And gates to said source of numbers, means coupling said first flip-flop first output to the other input of said second input And gate and to one input of said first feedback And gate, means coupling said first flip-flop second output to the other input of said first input And gate and to one input of said second feedback And gate, means coupling the outputs of said first input And gate and said first feedback And gate to said first register input stage, means coupling the outputs of said second input And gate and said second feedback And gate to said second register input stage, means coupling the output stage of said first register with the other input of said first feedback And gate, means coupling the output stage of said second register with the other input of said second feedback And gate, means to apply shift pulses to both said registers, size comparator means coupled to the input stages of said first and second registers to provide a first output when the digit in said first register input stage is the larger and to provide a second output when the digit in said second input stage is the larger, and means actuated after the entry of a binary number from said source into one of said two registers and responsive to an output from said size comparing means to energize one of said two flip-flop inputs whereby the largest or smallest number is retained in said registers and the other is replaced.

12. Apparatus as recited in claim 11 wherein said means actuated after the entry of a binary number and responsive to an output from said size comparing means is responsive to a first size comparing means output to energize said flip-flop first input whereby the largest of the numbers in said first and second registers is retained and the other is replaced by another number from said source.

13. Apparatus as recited in claim 11 wherein said means actuated after the entry of a binary number and responsive to an output from said size comparing means is responsive to a first size comparing means output to energize said flip-flop second input whereby the smallest of the numbers in said first and second registers is retained and the other is replaced by another number from said source.

14. Apparatus as recited in claim 11 wherein said means actuated after the entry of a binary number and responsive to an output from said size comparing means actuated after the entry of a binary number and responsive to an output from said size comparing means includes a second flip-flop having a first and second input and a first and second output respectively energized when either said first or said second input is energized, means coupling said size comparing means to said second flip-flop to energize said first input with said size comparing means first output and to energize said second input with said size comparing means second output, means to generate a pulse after entry of a binary number in said apparatus, a pair of And gates each having two inputs and an output, means coupling one input of said pair of And gates to said means to generate a pulse, means coupling another input of one of said pair of And gates to the first output of said second flip-flop, means coupling another input of the other of said pair of And gates to the second output of said second flip-flop, means coupling the output of said one And gate to the first input of said first flip-flop, and means coupling the output of said another And gate to the second input of said first flip-flop.

15. Apparatus as recited in claim 11 wherein said means actuated after the entry of a binary number and responsive to an output from said size comparing means actuated after the entry of a binary number and responsive to an output from said size comparing means includes a second flip-flop having a first and second input and a first and second output respectively energized when either said first or said second input is energized, means coupling said size comparing means to said second flip-flop to energize said first input with said size comparing means first output and to energize said second input with said size comparing means second output, means to generate a pulse after entry of a binary number in said apparatus, a pair of And gates each having two inputs and an output, means coupling one input of said pair of And gates to said means to generate a pulse, means coupling another input of one of said pair of And gates to the first output of said second flip-flop, means coupling another input of the other of said pair of And gates to the second output of said second flip-flop, means coupling the output of said one And gate to the second input of said first flip-flop and means coupling the output of said another And gate to the second input of said first flip-flop.

References Cited in the file of this patent

UNITED STATES PATENTS

| | | |
|---|---|---|
| 2,074,392 | Herbst | Mar. 23, 1937 |
| 2,444,421 | Boston | July 6, 1948 |
| 2,617,704 | Mallina | Nov. 11, 1952 |
| 2,674,733 | Robbins | Apr. 6, 1954 |
| 2,675,538 | Malthaner et al. | Apr. 13, 1954 |